United States Patent
Tsutsumi

(10) Patent No.: US 9,401,669 B2
(45) Date of Patent: Jul. 26, 2016

(54) MOTOR CONTROLLER FOR SYNCHRONOUSLY CONTROLLING MULTIPLE MOTORS

(71) Applicant: FANUC CORPORATION, Minamitsuru-gun, Yamanashi (JP)

(72) Inventor: Tomohisa Tsutsumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 25 days.

(21) Appl. No.: 14/229,583

(22) Filed: Mar. 28, 2014

(65) Prior Publication Data

US 2014/0292232 A1    Oct. 2, 2014

(30) Foreign Application Priority Data

Mar. 29, 2013    (JP) .................................. 2013-072934

(51) Int. Cl.
| | |
|---|---|
| H02P 1/54 | (2006.01) |
| H02P 5/52 | (2016.01) |
| H02P 29/02 | (2016.01) |
| H02P 5/74 | (2006.01) |

(52) U.S. Cl.
CPC ........... *H02P 5/526* (2013.01); *H02P 5/74* (2013.01); *H02P 29/025* (2013.01)

(58) Field of Classification Search
CPC ........... G05B 2219/42186; G05B 2219/45214; G05B 2219/50222
USPC ................................. 318/625, 41, 49, 51, 59
See application file for complete search history.

(56) References Cited

U.S. PATENT DOCUMENTS

| | | | | |
|---|---|---|---|---|
| 5,777,450 | A | * | 7/1998 | Kono et al. ............... 318/568.11 |
| 5,814,956 | A | * | 9/1998 | Kono et al. .................... 318/380 |
| 5,986,425 | A | * | 11/1999 | Onishi et al. .................. 318/569 |
| 6,046,566 | A | * | 4/2000 | Sonoda et al. ................. 318/625 |
| 6,534,944 | B2 | * | 3/2003 | Toyozawa et al. ............. 318/625 |
| 6,626,735 | B2 | * | 9/2003 | Ammi ................................ 451/5 |
| 6,888,334 | B2 | * | 5/2005 | Fujibayashi et al. ........... 318/625 |
| 8,019,460 | B2 | * | 9/2011 | Akaiwa et al. ................. 700/177 |
| 8,030,878 | B2 | * | 10/2011 | Iwashita et al. ............... 318/802 |
| 8,531,149 | B2 | * | 9/2013 | Kataoka et al. ............... 318/569 |

FOREIGN PATENT DOCUMENTS

| | | |
|---|---|---|
| CN | 202720487 U | 2/2013 |
| DE | 102007039915 A1 | 1/2009 |
| EP | 0747214 B1 | 9/1998 |

(Continued)

*Primary Examiner* — Rina Duda
(74) *Attorney, Agent, or Firm* — Hauptman Ham, LLP

(57) ABSTRACT

A motor controller includes: a converter for converting an alternating current to a direct current; a first inverter for converting the direct current in a direct-current link of the converter to an alternating current for driving a first motor; a second inverter for converting the direct current in the direct-current link to an alternating current for driving a second motor; a power-failure detection unit for detecting a power failure on the side with the alternating-current power supply; and a command creation unit for creating a drive command for each of the first inverter and the second inverter when no power failure has occurred, while creating a drive command for the first inverter and also creating a drive command for the second inverter by using position feedback information of the first motor driven according to the drive command for the first inverter, when a power failure has occurred.

19 Claims, 8 Drawing Sheets

(56) References Cited

FOREIGN PATENT DOCUMENTS

| JP | 8-227307 A | 9/1996 |
| JP | 2005-096061 A | 4/2005 |
| JP | 2005-117832 A | 4/2005 |
| JP | 2006-285752 A | 10/2006 |

* cited by examiner

MOTOR CONTROLLER FOR SYNCHRONOUSLY CONTROLLING MULTIPLE MOTORS

RELATED APPLICATIONS

The present application claims priority to Japanese Application Number 2013-072934, filed Mar. 29, 2013, the disclosure of which is hereby incorporated by reference herein in its entirety.

FIELD OF THE INVENTION

The present invention relates to a motor controller for synchronously controlling at least two motors, and in particular to a motor controller for synchronously controlling a tool-shaft motor for driving a tool and a workpiece-shaft motor for driving a workpiece in a machine tool.

DESCRIPTION OF THE RELATED ART

In a machine tool, a motor is generally provided for each drive shaft of the machine tool, and a motor controller controls the driving of the motors. The motor controller of such a machine tool includes: a converter (rectifier) that rectifies alternating-current (AC) power supplied from the AC power supply side with a three-phase AC input power supply, and then outputs direct-current (DC) power; and an inverter that is provided for each drive shaft while being connected to a DC link, which is on the DC side of the converter, and converts both DC power in the DC link and AC power, i.e., motoring power or regenerative power of the corresponding motor. The motor controller controls the speed, the torque, or the position of the rotor of the motor connected to the AC side of each inverter. In a machine tool such as a gear-processing machine or a cam-processing machine, a workpiece is processed by a tool by synchronously driving two rotational shafts, i.e., a tool-shaft motor for driving a tool and a workpiece-shaft motor for driving a workpiece. FIG. 7 is a diagram illustrating a tool shaft and a workpiece shaft of a gear-processing machine. In the gear-processing machine, a tool shaft for driving a tool such as a grindstone or a cutter, and a workpiece shaft for driving a workpiece are provided as drive shafts.

There are mainly two types of motor control for synchronously controlling a tool-shaft motor and a workpiece-shaft motor: the numerical-control (NC) command synchronization and the master/slave synchronization. Description will be given of these types of control below by referring to FIGS. 8 and 9 by taking, as an example, a case of synchronously controlling two motors.

FIG. 8 is a block diagram illustrating an example of the configuration of a motor controller using the NC-command synchronization. A motor controller 101 for synchronously controlling a motor A and a motor B includes: an inverter 51-A and an inverter 51-B, which are individually provided to supply an AC drive power to the motor A and to supply an AC drive power to the motor B, respectively; and a numerical controller 50, which controls the inverter 51-A and the inverter 51-B so that the inverter 51-A could output a drive power for causing the motor A to operate as desired while the inverter 51-B could output a drive power for causing the motor B to operate as desired. Each of the inverter 51-A and the inverter 51-B converts an input DC power to an AC power by a switching operation of a semiconductor switching element provided therein. Note that, in FIG. 8, illustration of converters each for converting an AC power supplied by an AC power supply to a DC power and then supplying the DC power to a corresponding one of the inverter 51-A and the inverter 51-B is omitted.

As illustrated in FIG. 8, the numerical controller 50 is provided with a drive-command creation unit 61. In the NC-command synchronization, the drive-command creation unit 61 creates drive commands for synchronously controlling the motor A and the motor B, and then outputs the respective commands to the inverter 51-A and the inverter 51-B. To enable the motor A and the motor B to synchronously operate at a predetermined synchronous ratio, one of the drive commands created by the drive-command creation unit 61 is multiplied by the synchronous ratio. One of the drive commands created by the drive-command creation unit 61 is transmitted to a drive-command reception unit 63-A in the inverter 51-A via a communication circuit 62-A, which is provided between the numerical controller 50 and the inverter 51-A; the other one of the drive commands is transmitted to a drive-command reception unit 63-B in the inverter 51-B via a communication circuit 62-B, which is provided between the numerical controller 50 and the inverter 51-B. A control unit 64-A controls the inverter 51-A so that the inverter 51-A could output an AC power for driving the motor A, on the basis of the received drive command and feedback pulses (referred to as "position feedback information") indicating positional information generated as a result of driving the motor A; a control unit 64-B controls the inverter 51-B so that the inverter 51-B could output an AC power for driving the motor B, on the basis of the received drive command and position feedback information indicating positional information generated as a result of driving the motor B. In this way, in the NC-command synchronization, the respective drive commands created by the drive-command creation unit 61 of the numerical controller 50 are output to the inverter 51-A and the inverter 51-B to synchronously control the motor A and the motor B.

FIG. 9 is a block diagram illustrating an example of the configuration of a motor controller using the master/slave synchronization. A motor controller 102 for synchronously controlling a motor A and a motor B includes: an inverter 71-A and an inverter 71-B, which are individually provided to supply an AC drive power to the motor A and to supply an AC drive power to the motor B, respectively; and a numerical controller 70, which controls the inverter 71-A and the inverter 71-B so that the inverter 71-A could output a drive power for causing the motor A to operate as desired while the inverter 71-B could output a drive power for causing the motor B to operate as desired. Each of the inverter 71-A and the inverter 71-B converts an input DC power to an AC power by a switching operation of a semiconductor switching element provided therein. In the example illustrated in FIG. 9, the shaft for driving the motor A is assumed to serve as a master shaft, while the shaft for driving the motor B is assumed to serve as a slave shaft. Note that, in FIG. 9, illustration of converters each for converting an AC power supplied by an AC power supply to a DC power and then supplying the DC power to a corresponding one of the inverter 71-A and the inverter 71-B is omitted.

As illustrated in FIG. 9, the numerical controller 70 is provided with a drive-command creation unit 81. In the master/slave synchronization, a drive command is created by the drive-command creation unit 81, and is then output to one of the inverter 71-A and the inverter 71-B (the inverter 71-A in the example illustrated in FIG. 9). The drive command created by the drive-command creation unit 81 is transmitted to a drive-command reception unit 83 in the inverter 71-A via a communication circuit 82-1 provided between the numerical controller 70 and the inverter 71-A. A control unit 84-A in the inverter 71-A controls the inverter 71-A so that the inverter 71-A could output an AC power for driving the motor A, on the basis of the received drive command and position feedback information generated as a result of driving the motor A. Moreover, the position feedback information resulting from the driving of the motor A is also transmitted to the inverter 71-B via a communication circuit 82-2, which is provided between the inverter 71-A and the inverter 71-B. The position feedback information (feedback pulses) of the motor A thus transferred is multiplied by a predetermined synchronous ratio, to create a drive command that is in proportion to the feedback pulses of the motor A for driving the master shaft. A controller 84-B in the inverter 71-B controls the inverter 71-B so that the inverter 71-B could output an AC power for driving the motor B, according to the drive command based on the above-described position feedback information of the motor A. Hence, in the master/slave synchronization, the motor A and the motor B are synchronously controlled in such a way that the motor for driving the master shaft (the motor A in the illustrated example) is driven on the basis of a drive command created by the drive-command creation unit 81 of the numerical controller 70, while the motor for driving the slave shaft (the motor B in the illustrated example) is driven on the basis of a drive command in proportion to position feedback information of the motor for driving the master shaft.

In a machine tool, both the NC-command synchronization and the master/slave synchronization are used depending on the situation in which the machine tool is used. For example, when the frequency of disturbance in a cutting operation is low, using the master/slave synchronization can increase the accuracy of the synchronous control. However, when the frequency of disturbance in a cutting operation is high, using the master/slave synchronization causes the slave shaft to vibrate due to vibration of the master shaft, which makes stable cutting impossible. For this reason, when the frequency of disturbance in a cutting operation is high, the NC-command synchronization is used. For example, assume that, in a gear-processing machine, the motors are synchronously controlled while the tool shaft and the workpiece shaft are engaged with each other, upon occurrence of a power failure on the AC power supply side of the motor controller. In such a case, if the motor controller becomes out of control due to the power failure, the synchronous relationship between the tool shaft and the workpiece shaft is ruined, and the tool, the workpiece, or the body of the machine tool itself may be damaged. To avoid such a situation, an operation for separating one of the tool shaft and the workpiece shaft from the other shaft needs to be performed while the synchronous relationship between the tool shaft and the workpiece shaft is maintained, even when a power failure occurs. For the operation, in general, a bulk, interruptible power supply or capacitor is provided in machine tools, as a backup power supply for a shaft-separating operation to be performed when a power failure occurs. However, a bulk backup power supply has disadvantages of being expensive and space-consuming.

To reduce the cost of and the space for a backup power supply, the following control method has been proposed. In the control method, when a power failure occurs, a drive voltage for a shaft-separating operation is secured as DC voltage in a DC link by using regenerative energy generated by deceleration of the motor of the tool shaft or the workpiece shaft, which allows the tool shaft and the workpiece shaft to be separated from each other while being synchronously controlled, for a period of time after the occurrence of the power failure. In such a control method of using regenerative energy generated when the corresponding motor decelerates, the DC voltage in the DC link needs to be monitored to perform deceleration control or acceleration control on the motor so that the DC voltage could stay within a predetermined range. For example, as described in Japanese Laid-open Patent Publication No. H08-227307, a technique has been proposed for performing a shaft-separating operation for separating a tool shaft and a workpiece shaft from each other while driving the tool shaft and the workpiece shaft so as to maintain the synchronous relationship between the shafts, in a motor controller based on the master/slave synchronization. In the technique, upon detection of a power failure on the AC power supply side, a deceleration command is supplied to the tool shaft, to secure a control voltage for driving the motors using a DC voltage in the DC link by using regenerative energy generated at the time of the deceleration. The DC voltage in the DC link is monitored by the amplifier (inverter) for the master shaft, and, when the master-shaft motor is controlled to decelerate, the slave-shaft motor also decelerates on the basis of the feedback information of the master-shaft motor. Hence, using the technique enables deceleration control of the master shaft and the slave shaft, and also a shaft-separating operation for separating the tool shaft and the workpiece shaft from each other, while maintaining the synchronous relationship between the master shaft and the slave shaft.

As described above, in a machine tool, both the NC-command synchronization and the master/slave synchronization are used depending on the situation in which the machine tool is used. In some use of a machine tool, the NC-command synchronization is preferably used instead of the master/slave synchronization as a two-shaft synchronization method. For example, when the frequency of disturbance in a cutting operation is high, the NC-command synchronization is usually used for the above-described reason. However, when the NC-command synchronization is used, synchronous driving and a shaft-separating operation that use regenerative energy generated by deceleration of motors are difficult to perform, for the following reasons. In the NC-command synchronization, control is performed in such a manner that the numerical controller supplies respective synchronized drive commands to both the tool shaft and the workpiece shaft. In such a control, to perform the above-described shaft-separating operation using regenerative energy generated at deceleration of the motor, the DC voltage in the DC link needs to be monitored on the numerical controller side, to keep the DC voltage in the DC link within a predetermined range by supplying deceleration or acceleration commands to the tool shaft and the workpiece shaft on the basis of the monitoring result. However, information on the DC voltage in the DC link is generally acquired on the amplifier (inverter) side. Accordingly, the acquired information on the DC voltage in the DC link needs to be transmitted from the amplifier side to the numerical controller side, and moreover the numerical controller side needs to perform operations of creating deceleration or acceleration commands for the tool shaft and the workpiece shaft on the basis of the information thus transmitted, and then outputting the commands to the amplifier side. Such a series of operations includes an operation for transmitting information on the DC voltage in the DC link, an operation for creating commands, and an operation for outputting the commands, for example. Accordingly, it requires time between when information on the DC voltage in the DC link is acquired and when the operation for outputting the commands based on the information is performed. In other words, there is a time delay between the occurrence of a power failure and output of commands based on the detected voltage. When a power failure occurs in the AC power supply side in a motor controller having relatively high energy consumption as the entire system in a normal control state with no power failure on the AD power supply side, the DC voltage in the DC link rapidly decreases, and/or quickly exceeds an allowable voltage level if the amount of regenerative energy generated at the deceleration of the motor is too large. Hence, when the NC-command synchronization involving the above-described delay is used, synchronous driving and the shaft-separating operation using the above-described deceleration energy from the motor are difficult to perform, consequently requiring a bulk backup power supply.

SUMMARY OF THE INVENTION

In view of the above problems, an object of the present invention is to provide a low-cost, space-saving motor controller that is capable of performing a shaft-separating operation in a machine tool for synchronously controlling at least two motors, when a power failure occurs on the AC power supply side. To achieve the above object, a motor controller for synchronously controlling at least two motors includes: a converter that converts an alternating-current power supplied from a side with an alternating-current power supply, to a direct-current power and outputs the direct-current power; a first inverter that is connected to a direct-current link provided on a direct-current side of the converter, and converts the direct-current power in the direct-current link to an alternating-current power for driving a first motor and outputs the alternating-current power, on the basis of a received command; a second inverter that is connected to the direct-current link, and converts the direct-current power in the direct-current link to an alternating-current power for driving a second motor and outputs the alternating-current power, on the basis of a received command; a power-failure detection unit that detects whether or not a power failure has occurred on the side, with the alternating-current power supply, of the inverter; and a command creation unit that creates, for each of the first inverter and the second inverter, a numerical-control-command-synchronization drive command for synchronously controlling the first motor and the second motor, when the power-failure detection unit does not detect any power failure, while creating a master drive command for the first inverter and also creating, for the second inverter, a slave drive command for synchronously controlling the first motor and the second motor by using position feedback information of the first motor driven according to the master drive command, when the power-failure detection unit detects a power failure.

The command creation unit may include a direct-current-voltage-maintaining-command creation unit for creating, as the master drive command, a direct-current-voltage maintaining command for controlling the first inverter so that a voltage in the direct-current link would stay within a predetermined range, and the direct-current-voltage-maintaining-command creation unit may be provided in the first inverter.

The command creation unit may include a drive-command creation unit for creating the numerical-control-command-synchronization drive command, the drive-command creation unit may be provided in a numerical controller that controls operations of the first motor and the second motor as a whole. The slave drive command, for the second inverter, for synchronously controlling the first motor and the second motor by using the position feedback information when the power-failure detection unit detects a power failure, may be created in the second inverter.

Moreover, the motor controller may further include: a first communication unit that connects the drive-command creation unit and the first inverter to enable the drive-command creation unit and the first inverter to communicate with each other; and a second communication unit that connects the drive-command creation unit and the second inverter to enable the drive-command creation unit and the second inverter to communicate with each other. In this case, the numerical-control-command-synchronization drive command created by the drive-command creation unit when the power-failure detection unit does not detect any power failure, is transmitted to each of the first inverter and the second inverter via the first communication unit and the second communication unit, respectively.

Furthermore, the motor controller may further include a third communication unit that connects the first inverter and the second inverter to enable the first inverter and the second inverter to communicate with each other. In this case, the position feedback information transmitted from the first motor to the first inverter when the power-failure detection unit detects a power failure, is transferred to the second inverter via the third communication unit.

Alternatively, the motor controller may further include a branching unit that divides the position feedback information from the first motor and provides the first inverter and the second inverter with obtained respective pieces of the position feedback information.

Moreover, any one of the first motor and the second motor may be a tool-shaft motor for driving a tool shaft of a machine tool to rotate, while the other may be a workpiece-shaft motor for driving a workpiece shaft of the machine tool to rotate.

Furthermore, the motor controller may further include a third inverter that is connected to the direct-current link, and converts the direct-current power in the direct-current link to an alternating-current power for driving a tool-moving-shaft motor for controlling a distance between the tool shaft and the workpiece shaft, and outputs the alternating-current power, on the basis of a received command. The command creation unit may include a separation-command creation unit that creates, for the third inverter, a separation command for driving the tool-moving-shaft motor so that one of the tool shaft and the workpiece shaft is separated from the other, when the power-failure detection unit detects a power failure.

The tool shaft may be a shaft for driving a tool in any one of a gear-processing machine and a cam-processing machine.

BRIEF DESCRIPTION OF THE DRAWINGS

The present invention can be understood more clearly by referring to the accompanying drawings in which.

DETAILED DESCRIPTION OF THE PREFERRED EMBODIMENT

Figure 1:
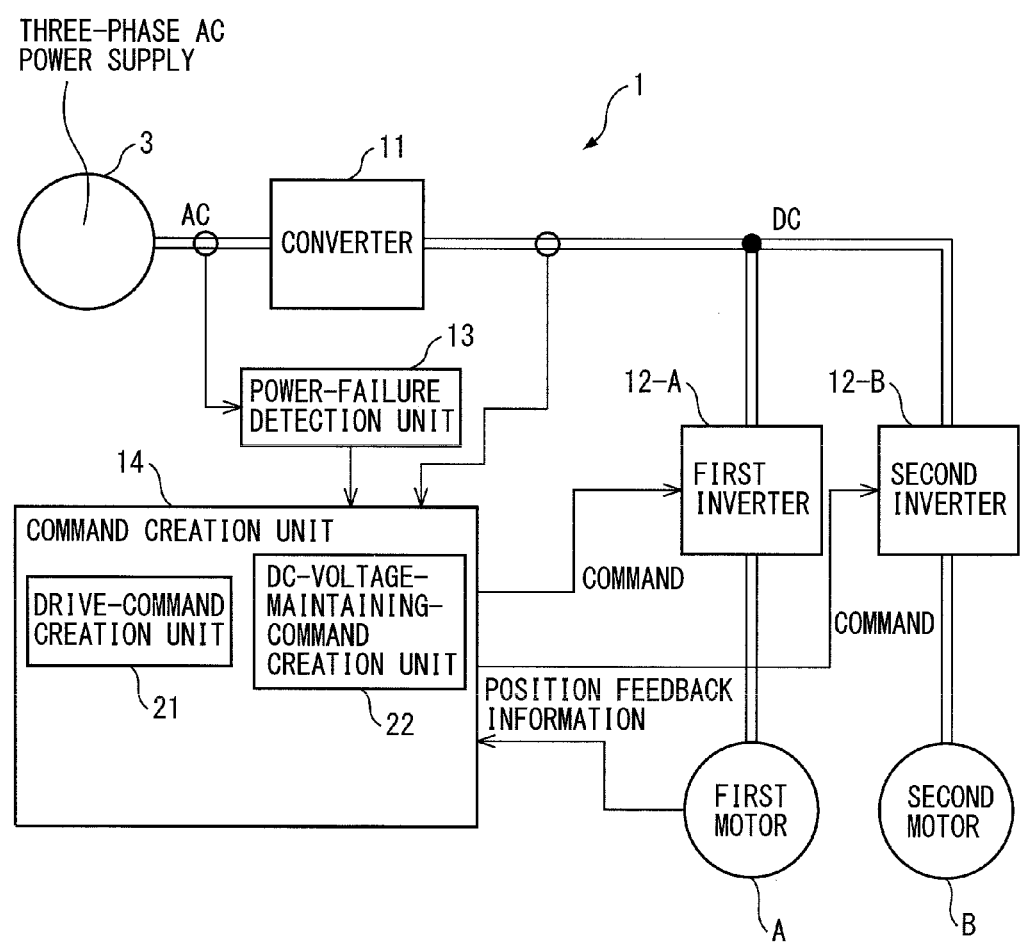
FIG. 1 is a functional block diagram illustrating a motor controller.

In the following, description will be given of a motor controller for synchronously controlling multiple motors, by referring to the drawings. However, it is to be understood that the present invention is not limited to the drawings or the embodiments to be described below.

FIG. 1 is a functional block diagram illustrating a motor controller. In the following, components denoted by the same characters are to have the same functions. In the description below, functions of a motor controller 1 for synchronously controlling two motors, a motor A and a motor B, will be described. One of the first motor A and the second motor B is a tool-shaft motor for driving a tool shaft of a machine tool to rotate, and the other one is a workpiece-shaft motor for driving a workpiece shaft of the machine tool to rotate. The tool shaft is a shaft for driving a tool in a gear-processing machine or a cam-processing machine. For example, in a gear-processing machine, a tool shaft for driving a tool such as a grindstone or a cutter, and a workpiece shaft for driving a workpiece are provided as drive shafts. Note that the number of motors controlled by the motor controller 1 may be more than two. The motor controller 1 for synchronously controlling the first motor A and the second motor B includes a converter 11, a first inverter 12-A, a second inverter 12-B, a power-failure detection unit 13, and a command creation unit 14. The converter 11 rectifies an AC power supplied from the side with a three-phase AC power supply 3 (referred to simply as an "AC power supply" below), and then outputs obtained DC power to a DC link provided on the DC side of the converter 11. The converter 11 used in the motor controller 1 is not limited to any particular embodiment, and may be a three-phase full wave rectifier circuit with a 120-degree conduction regeneration function, or a pulse width modulation (PWM) control integrated rectifier circuit, for example. The converter 11 is connected to each of the first inverter 12-A and the second inverter 12-B via the DC link. The first inverter 12-A and the second inverter 12-B are each configured as a converter circuit including a switching element therein, such as a PWM inverter, for example. Since a case in which the motor controller 1 synchronously controls the first motor A and the second motor B is taken as an example, the first inverter 12-A and the second inverter 12-B are provided respectively for the first motor A and the second motor B to be driven.

The first inverter 12-A converts a DC power supplied from the DC link side, to a three-phase AC power having a desired voltage and a desired frequency for driving the first motor A, by causing the switching element provided inside the first inverter 12-A to perform an switching operation on the basis of a received command from the command creation unit 14. Accordingly, the first motor A operates on the basis of the voltage-variable and frequency-variable, three-phase AC power thus supplied. Moreover, at the time of braking the first motor A, a regenerative power is generated. The first inverter 12-A converts an AC power that is the regenerative power generated at the first motor A, to a DC power on the basis of a received command from the command creation unit 14, and then returns the obtained DC power to the DC link. As has been described, the first inverter 12-A converts both a DC power in the DC link and an AC power that is motoring power or regenerative power of the first motor A, on the basis of received commands.

Similarly, the second inverter 12-B converts a DC power supplied from the DC link side, to a three-phase AC power having a desired voltage and a desired frequency for driving the second motor B, by causing the switching element provided inside the second inverter 12-B to perform an switching operation on the basis of a received command from the command creation unit 14. Accordingly, the second motor B operates on the basis of the voltage-variable and frequency-variable, three-phase AC power thus supplied. In addition, at the time of braking the second motor B, the second inverter 12-B converts an AC power that is a regenerative power generated at the second motor B, to a DC power on the basis of a received command from the command creation unit 14, and then returns the obtained DC power to the DC link. As has been described, the second inverter 12-B also converts both a DC power in the DC link and an AC power that is motoring power or regenerative power of the second motor B, on the basis of received commands.

The power-failure detection unit 13 detects whether or not a power failure has occurred on the side, with the AC power supply 3, of the inverter 11. In the illustrated example, the power-failure detection unit 13 detects whether or not a power failure has occurred on the side, with the AC power supply 3, of the converter 11 by using an AC voltage of the AC power supply 3. However, the power-failure detection unit 13 may detect whether or not a power failure has occurred on the side, with the AC power supply 3, of the converter 11 by using a DC voltage in the DC link, which is on the DC side of the converter 11. A power-failure detection signal generated by the power-failure detection unit 13 is transmitted to the command creation unit 14.

The command creation unit 14 includes a drive-command creation unit 21 and a DC-voltage-maintaining-command creation unit 22.

The drive-command creation unit 21 creates a drive command for NC-command synchronization (to be referred to as an "NC-command-synchronization drive command" below), for each of the first inverter 12-A and the second inverter 12-B, to synchronously control the first motor A and the second motor B, when the power-failure detection unit 13 does not detect any power failure.

When the power-failure detection unit 13 detects no power failure, the power conversion operations of the first inverter 12-A and the second inverter 12-B are controlled on the basis of the respective NC-command-synchronization drive commands thus created.

By contrast, when the power-failure detection unit 13 detects a power failure, the power conversion operation of the first inverter 12-A is controlled on the basis of a DC-voltage maintaining command for maintaining the voltage in the DC link within the predetermined range, the command being created as a master drive command by the DC-voltage-maintaining-command creation unit 22. Thus, the first motor A is driven according to the DC-voltage maintaining command as a master drive command. The position feedback information of the first motor A driven on the basis of the drive command is used to create a slave drive command for the second inverter 12-B for synchronous control of the first motor A and the second motor B. The slave drive command is generated in the second inverter 12-B.

Next, description will be given of concrete examples of the first inverter 12-A, the second inverter 12-B, the power-failure detection unit 13, and the command creation unit 14 described above. As described above, one of the first motor A and the second motor B, which are synchronously controlled by the motor controller 1, is a tool-shaft motor for driving the tool shaft of the machine tool to rotate, and the other one is a workpiece-shaft motor for driving the workpiece shaft of the machine tool to rotate. In the following description, a case in which the first motor A serves as a tool-shaft motor while the second motor B serves as a workpiece-shaft motor will be described as an example.

Figure 2:
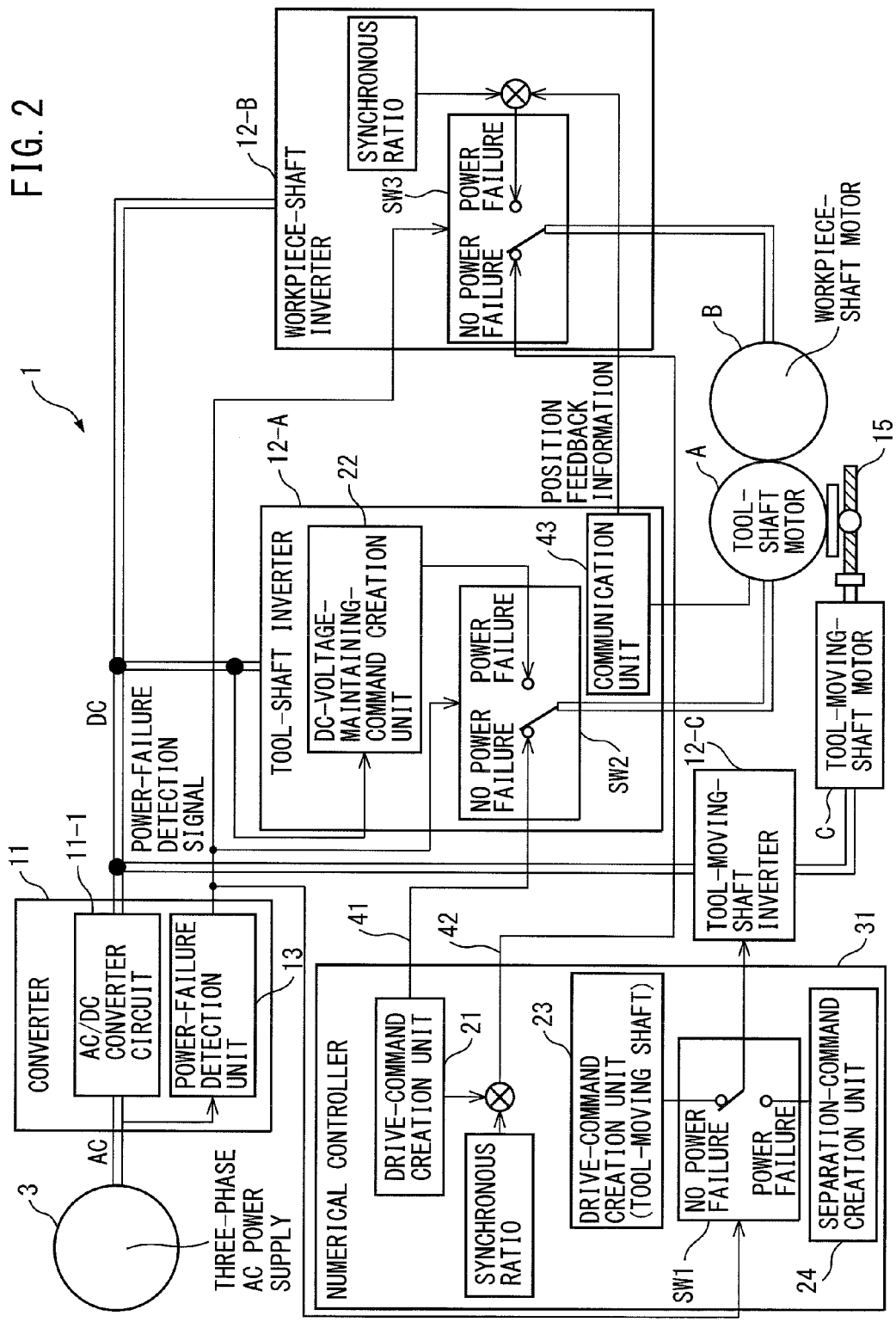
FIG. 2 is a block diagram illustrating a concrete configuration of a motor controller according to a first example.

FIG. 2 is a block diagram illustrating a concrete configuration of a motor controller according to a first example.

In the first example, the power-failure detection unit 13 is provided in a control unit in the converter 11. The reference numeral 11-1 denotes an AC/DC converter circuit 11-1 provided in the converter 11 and including a bridge circuit with a switching element.

In a tool-shaft inverter 12-A for outputting an AC power for driving the tool-shaft motor A, the DC-voltage-maintaining-command creation unit 22, a selector switch SW2, and a communication unit 43 are provided in addition to a DC/AC converter circuit (not illustrated) including a bridge circuit with a switching element. The selector switch SW2 is switched to enable the tool-shaft inverter 12-A to perform a corresponding power conversion operation depending on whether or not a power failure has occurred, and will be described later in terms of the operation. The communication unit 43 functions as a communication unit for connecting the tool-shaft inverter 12-A and the workpiece-shaft inverter 12-B to enable the inverters 12-A and 12-B to communicate with each other. Specifically, the communication unit 43 is a communication circuit for connecting a control unit in the tool-shaft inverter 12-A and a control unit in the workpiece-shaft inverter 12-B, and may be wired or wireless.

In the workpiece-shaft inverter 12-B for outputting an AC power for driving the workpiece-shaft motor B, a selector switch SW3 is provided in addition to a DC/AC converter circuit (not illustrated) including a bridge circuit with a switching element. The selector switch SW3 is switched to enable the workpiece-shaft inverter 12-B to perform a corresponding power conversion operation depending on whether or not a power failure has occurred, and will be described later in terms of the operation.

A tool-moving-shaft motor C is provided, and drives a tool-moving shaft for separating one of the tool shat and the workpiece shaft from the other, when the power-failure detection unit 13 detects a power failure. A tool-moving-shaft inverter 12-C is connected to the DC link, and converts a DC power in the DC link to an AC power for driving the tool-moving-shaft motor C for adjusting the distance between the tool shaft and the workpiece shaft, on the basis of a received command, and then outputs the AC power.

In a numerical controller 31 for controlling the operations of the tool-shaft motor 12-A and the workpiece-shaft motor 12-B as a whole, the drive-command creation unit 21, a tool-moving-shaft drive-command creation unit 23, a selector switch SW1, and a separation-command creation unit 24 are provided. The selector switch SW1 functions as a unit for creating a command for a power conversion operation of the tool-moving-shaft inverter 12-C, and switches the connection between the tool-moving-shaft drive-command creation unit 23 and the separation-command creation unit 24 depending on whether or not a power failure has occurred. The tool-moving-shaft drive-command creation unit 23 creates a command for controlling the tool-moving-shaft inverter 12-C so that the tool-moving-shaft motor C would perform an operation for bringing the tool shaft and the workpiece shaft closer to perform a processing operation when no power failure has occurred (i.e., under normal operating conditions). The separation-command creation unit 24 creates a command for controlling the tool-moving-shaft inverter 12-C so that the tool-moving-shaft motor C would perform an operation for separating one of the tool shaft and the workpiece shaft from the other when a power failure has occurred.

A communication circuit 41 is provided between the drive-command creation unit 21 in the numerical controller 31 and the tool-shaft inverter 12-A, to connect the drive-command creation unit 21 and the tool-shaft inverter 12-A so that the drive-command creation unit 21 and the tool-shaft inverter 12-A could communicate with each other. A communication circuit 42 is provided between the drive-command creation unit 21 in the numerical controller 31 and the workpiece-shaft inverter 12-B, to connect the drive-command creation unit 21 and the workpiece-shaft inverter 12-B so that the drive-command creation unit 21 and the workpiece-shaft inverter 12-B could communicate with each other. The communication circuits 41 and 42 may be wired or wireless.

Figure 3:
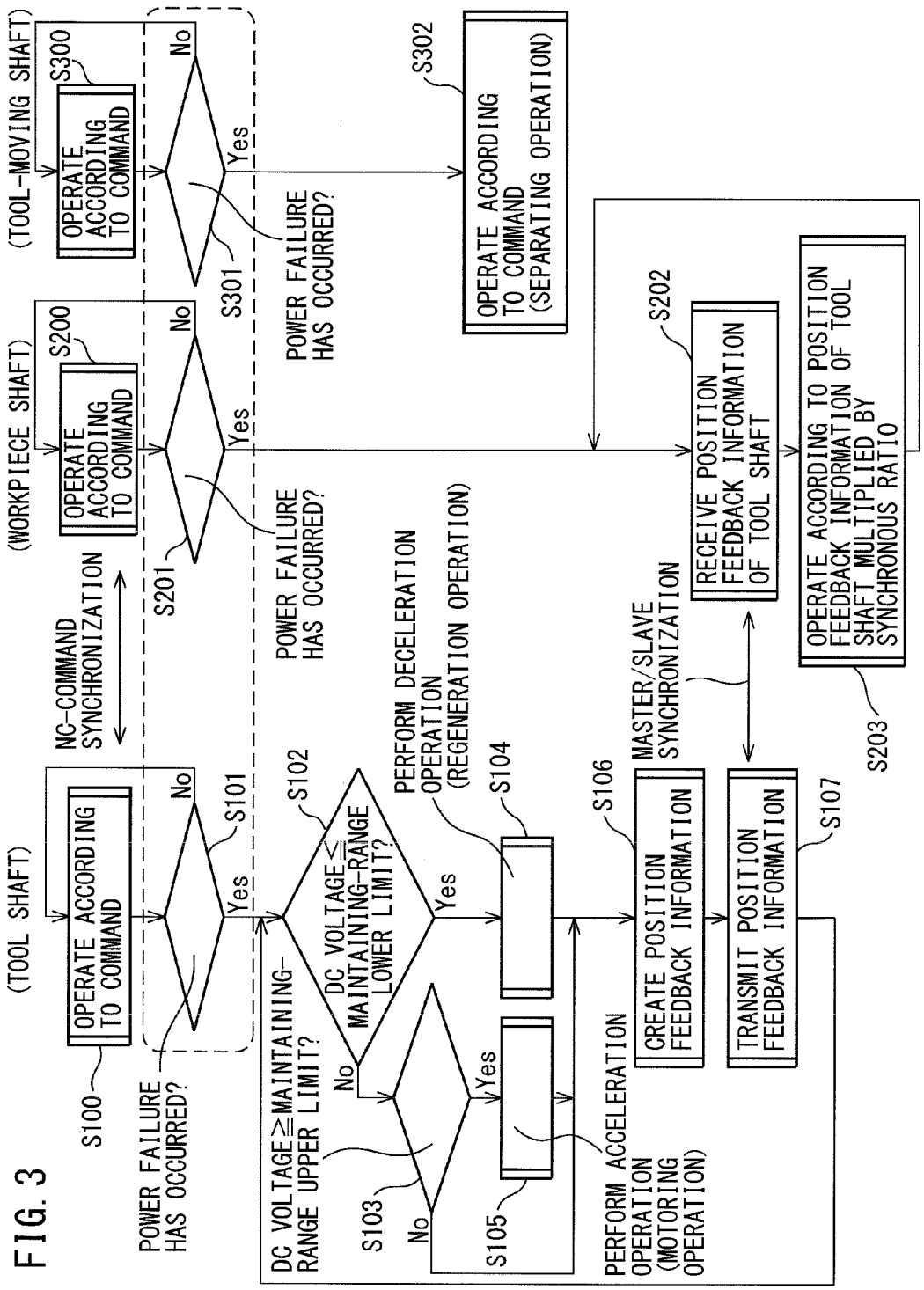
FIG. 3 is a flowchart representing an operation flow of the motor controller illustrated in FIG. 2.
Figure 4:
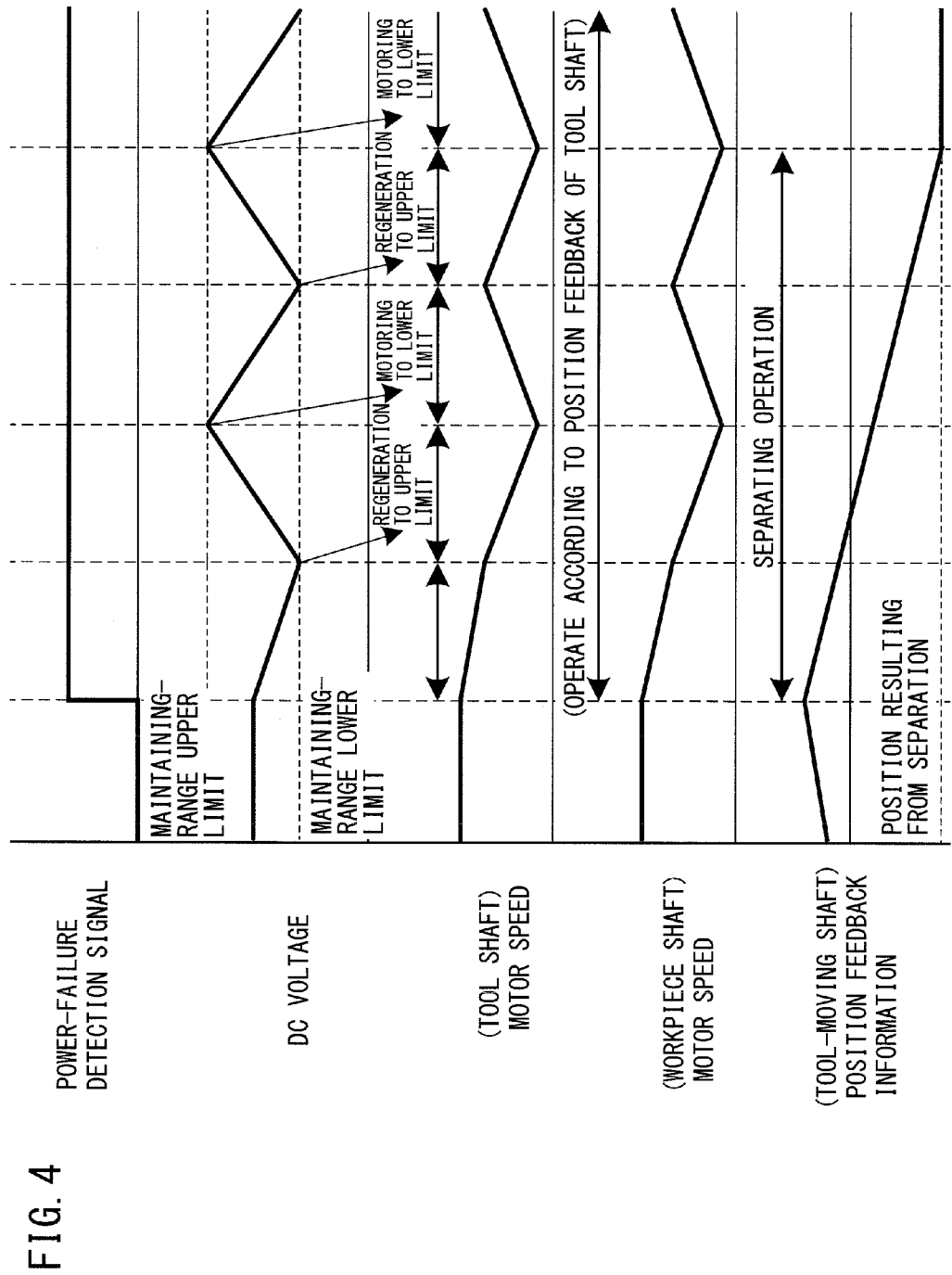
FIG. 4 is a timing chart illustrating operations of the motor controller illustrated in FIG. 2.

Next, operations of the motor controller illustrated in FIG. 2 will be described by referring to FIGS. 3 and 4. FIG. 3 is a flowchart representing an operation flow of the motor controller illustrated in FIG. 2. FIG. 4 is a timing chart illustrating operations of the motor controller illustrated in FIG. 2.

When no power failure has occurred (i.e., under normal operating conditions), an NC-command-synchronization drive command created for the tool shaft by the drive-command creation unit 21 in the numerical controller 31 according to the processing to be performed by the machine tool is output to the tool-shaft inverter 12-A via the communication circuit 41. Moreover, an NC-command-synchronization drive command created for the workpiece shaft by multiplying, by a pre-set synchronous ratio, the NC-command-synchronization drive command created for the tool shaft by the drive-command creation unit 21 is output to the workpiece-shaft inverter 12-B via the communication circuit 42. In response to these NC-command-synchronization drive commands, as for the tool shaft, the tool-shaft motor A operates using the AC power output by the tool-shaft inverter 12-A (STEP S100); as for the workpiece shaft, the workpiece-shaft motor B operates using the AC power output by the workpiece-shaft inverter 12-B (STEP S200). Thus, when no power failure has occurred (i.e., under normal operating conditions), NC-command synchronization is enabled between the tool-shaft motor A and the workpiece-shaft motor B, since both the tool-shaft motor A and the workpiece-shaft motor B operate on the basis of the respective NC-command-synchronization drive commands created by the drive-command creation unit 21 in such a way. Furthermore, a tool-moving-shaft drive command created by the tool-moving-shaft drive-command creation unit 23 to enable a predetermined processing operation is output to the tool-moving-shaft inverter 12-C. In response to the tool-moving-shaft drive command, as for the tool-moving shaft, the tool-moving-shaft motor C operates using an AC power output by the tool-moving-shaft inverter 12-C (STEP S300).

In STEPS S101, S201, and S301, the numerical controller 31 judges whether or not a power failure has occurred on the AC power supply side of the inverter 11, on the basis of a received power-failure detection signal (FIG. 4) from the power-failure detection unit 13. The power-failure detection signal is output to the selector switch SW1 in the numerical controller 31, the selector switch SW2 in the tool-shaft inverter 12-A, and the selector switch SW3 in the workpiece-shaft inverter 12-B. When the numerical controller 31 judges that a power failure has occurred on the AC power supply side, on the basis of the power-failure detection signal, the switch SW1, the switch SW2, and the switch SW3 are switched from a "no power failure" side to a "power failure" side, and the individual shafts thereby operate as follows. When a power failure has occurred, the motor for each of the shafts is driven by an AC power obtained by converting the DC power in the DC link.

First, operations of the tool shaft at the time with an occurrence of a power failure will be described.

In STEP S102, the DC-voltage-maintaining-command creation unit 22 provided in the tool-shaft inverter 12-A judges whether or not the DC voltage in the DC link is lower than or equal to the lower limit of a predetermined voltage-maintaining range. When the DC voltage is lower than or equal to the lower limit, the process advances to STEP S104, otherwise advances to STEP S103.

When the DC voltage in the DC link is judged to be lower than or equal to the lower limit of the predetermined voltage-maintaining range in STEP S102, the DC-voltage-maintaining-command creation unit 22 creates a DC-voltage maintaining command as a master drive command for controlling the tool-shaft inverter 12-A so that the tool-shaft inverter 12-A would output an AC power for the tool-shaft motor A to perform a regeneration operation, in STEP S104. On the basis of the DC-voltage maintaining command as a master drive command, the tool-shaft inverter 12-A controls the switching operation of the switching element provided therein so that the tool-shaft motor A would perform a deceleration operation. Then, the tool-shaft inverter 12-A converts an AC power regenerated by the tool-shaft motor A, to a DC power, and returns the DC power to the DC link. By the regeneration operation, the DC voltage in the DC link increases (FIG. 4). After STEP S104, the process advances to STEP S106.

When the DC voltage in the DC link is not judged to be lower than or equal to the lower limit of the predetermined voltage-maintaining range in STEP S102, the DC-voltage-maintaining-command creation unit 22 judges, in STEP S103, whether or not the DC voltage in the DC link is higher than or equal to the upper limit of the predetermined voltage-maintaining range. When the DC voltage is higher than or equal to the upper limit, the process advances to STEP S105, otherwise advances to STEP S106.

When the DC voltage in the DC link is judged to be higher than or equal to the upper limit of the predetermined voltage-maintaining range in STEP S103, the DC-voltage-maintaining-command creation unit 22 creates a DC-voltage maintaining command for controlling the tool-shaft inverter 12-A so that the tool-shaft inverter 12-A would output an AC power for the tool-shaft motor A to perform a motoring operation, in STEP S105. On the basis of the DC-voltage maintaining command, the tool-shaft inverter 12-A controls a switching operation of the switching element provided therein so that the tool-shaft motor A would perform an acceleration operation or a constant-speed maintaining operation. Then, the tool-shaft inverter 12-A converts the DC power in the DC link to an AC power, and outputs the AC power to the tool-shaft motor A. By these operations, the tool-shaft motor A accelerates or maintains a certain speed, while the DC power in the DC link is consumed and the DC voltage decreases accordingly (FIG. 4). After STEP S105, the process advances to STEP S106.

In STEP S106, the tool-shaft motor A creates position feedback information (feedback pulses) (FIG. 4), and the position feedback information created by the tool-shaft motor A is transferred from the tool-shaft inverter 12-A to the workpiece-shaft inverter 12-B via the communication unit 43 in STEP S107. Thereafter, the process returns to STEP S102. Then, the operations in STEPS S102 to S107 are repeatedly performed, to control the motor speed for the tool shaft so that the DC voltage in the DC link would stay within the predetermined voltage-maintaining range (FIG. 4).

Next, operations of the workpiece shaft at the time with a power failure will be described.

In STEP S202, the workpiece-shaft inverter 12-B receives the position feedback information from the tool-shaft inverter 12-A via the communication unit 43. Then, in STEP S203, the control unit in the workpiece-shaft inverter 12-B multiplies the received position feedback information of the tool-shaft motor A by the predetermined synchronous ratio, and thereby creates a slave drive command in proportion to the feedback pulses of the tool-shaft motor A. According to the slave drive command based on the position feedback information of the tool-shaft motor A thus created, the workpiece-shaft inverter 12-B outputs an AC power for driving the workpiece-shaft motor B. By using the AC power, the workpiece-shaft motor B operates. Thus, the workpiece-shaft motor B operates synchronously with the tool-shaft motor A on the basis of the slave drive command created by using the position feedback information of the tool-shaft motor A as described above. This enables the master/slave synchronization in which the tool shaft serves as the master shaft and the workpiece shaft serves as the slave shaft.

Next, operations of the tool-moving shaft at the time with an occurrence of a power failure will be described.

In STEP S302, the separation-command creation unit 24 in the numerical controller 31 creates a separation command for controlling the tool-moving-shaft inverter 12-C so that the tool-moving-shaft motor C would perform an operation for separating one of the tool shaft and the workpiece shaft from the other at the time with a power failure, and then outputs the created separation command to the tool-moving-shaft inverter 12-C. On the basis of the separation command, the tool-moving-shaft inverter 12-C controls the switching operation of the switching element provided therein. Thereby, the tool-moving-shaft inverter 12-C converts the DC power in the DC link to an AC power, and then outputs the obtained AC power to the tool-moving-shaft motor C. By using the AC power, the tool-moving-shaft motor C causes the tool-moving shaft to operate so that one of the tool shaft and the workpiece shaft would be separated from the other. In terms of the separating operation, the tool-moving-shaft motor C uses the DC power in the DC link as an energy source, and is supposed to complete the operation within the limits of the DC power.

As described above, according to the first example, the tool-shaft motor A and the workpiece-shaft motor B are synchronously controlled in the NC-command synchronization, when no power failure has occurred on the AC power supply side (i.e., under normal operating conditions). By contrast, when a power failure has occurred on the AC power supply side, the tool-shaft motor A and the workpiece-shaft motor B are synchronously controlled on the basis of the master/slave synchronization. At the same time, the tool-moving-shaft motor C is controlled so that the tool-moving shaft would perform a separating operation, and the DC voltage in the DC link used as an energy source at the time with a power failure is controlled to stay within the predetermined voltage-maintaining range. With the DC-voltage control, the DC voltage in the DC link is unlikely to rapidly decrease or exceed the allowable voltage level due to the shaft-separating operation performed when a power failure has occurred.

Figure 5:
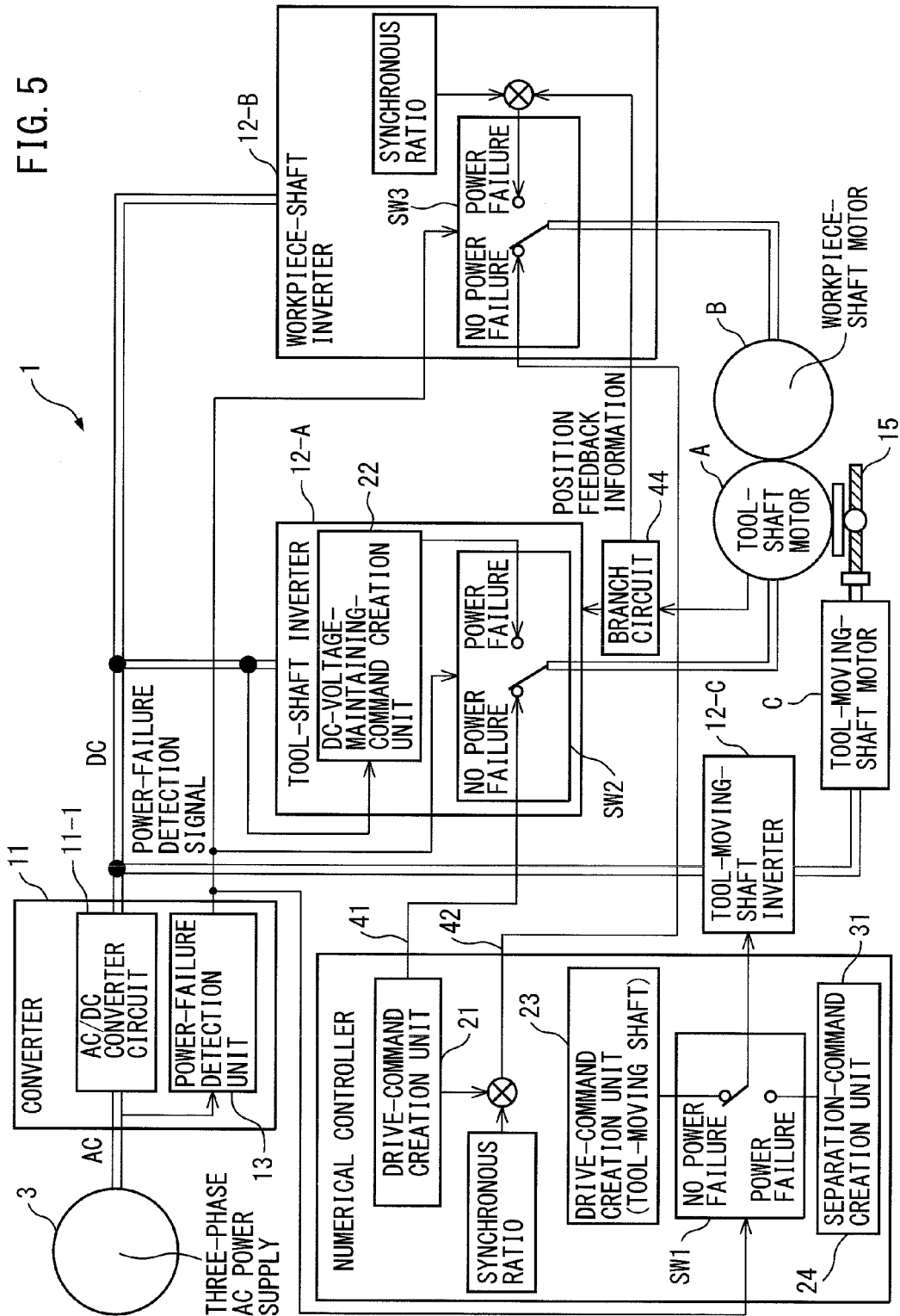
FIG. 5 is a block diagram illustrating a concrete configuration of a motor controller according to a second example.
Figure 6:
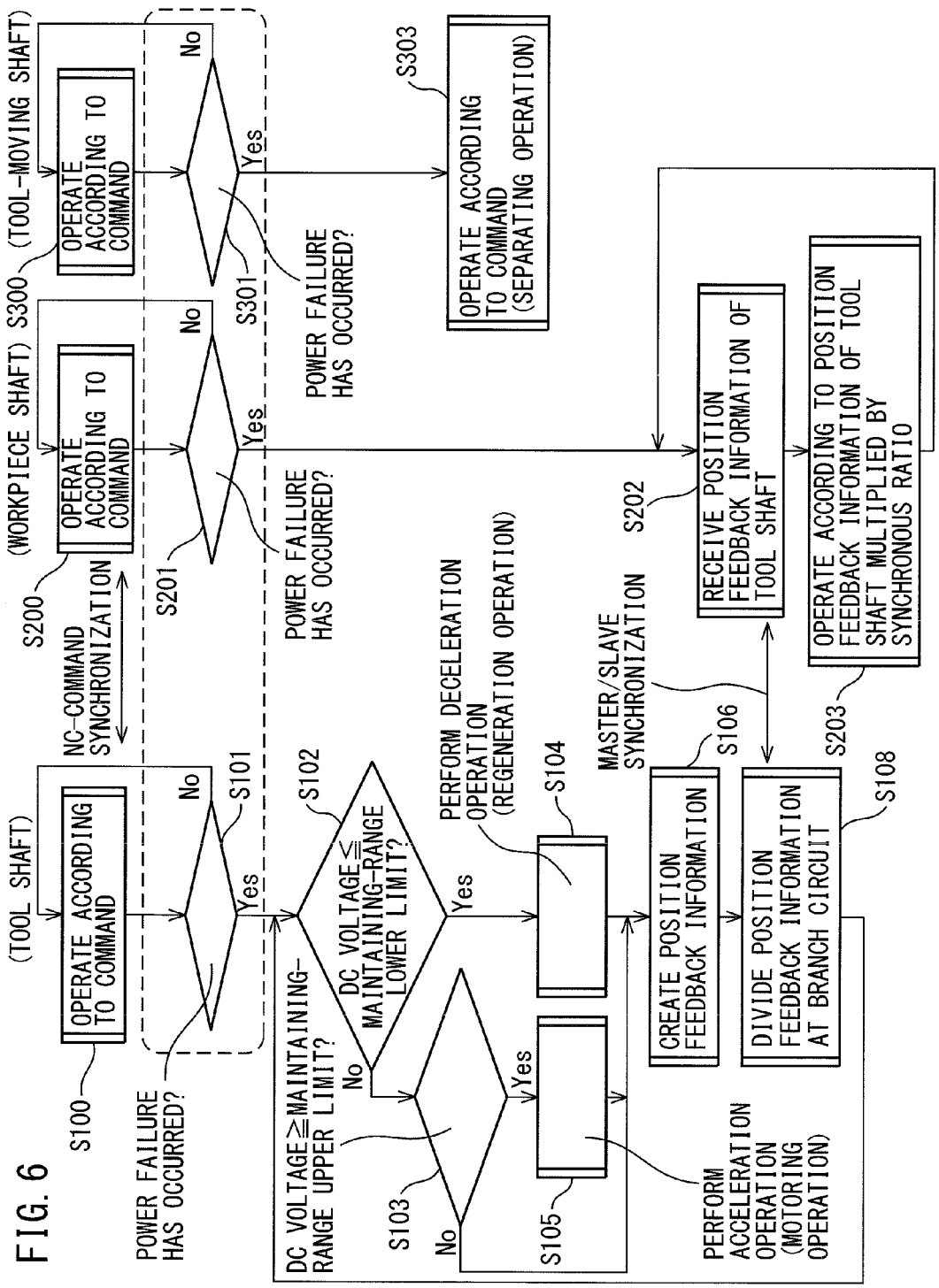
FIG. 6 is a flowchart representing an operation flow of the motor controller illustrated in FIG. 5.
Figure 7:
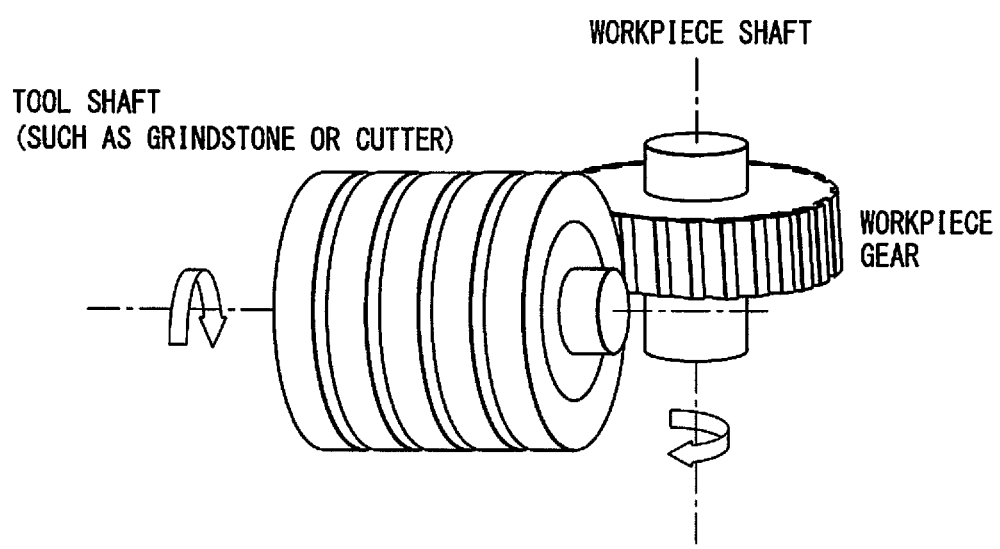
FIG. 7 is a diagram illustrating a tool shaft and a workpiece shaft of a gear-processing machine.
Figure 8:
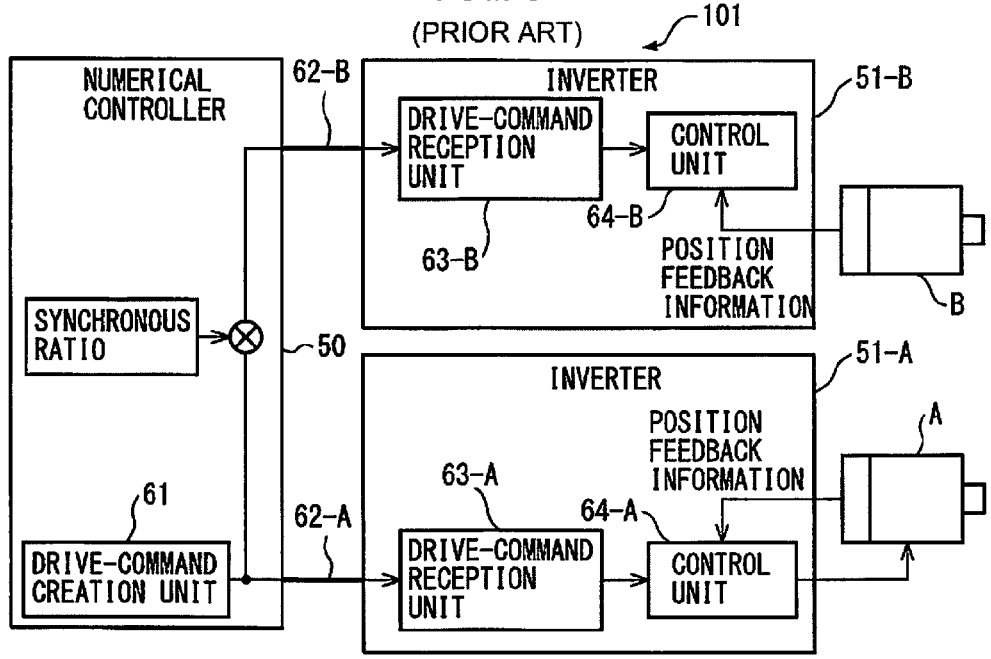
FIG. 8 is a block diagram illustrating an example of the configuration of a motor controller based on the NC-command synchronization.
Figure 9:
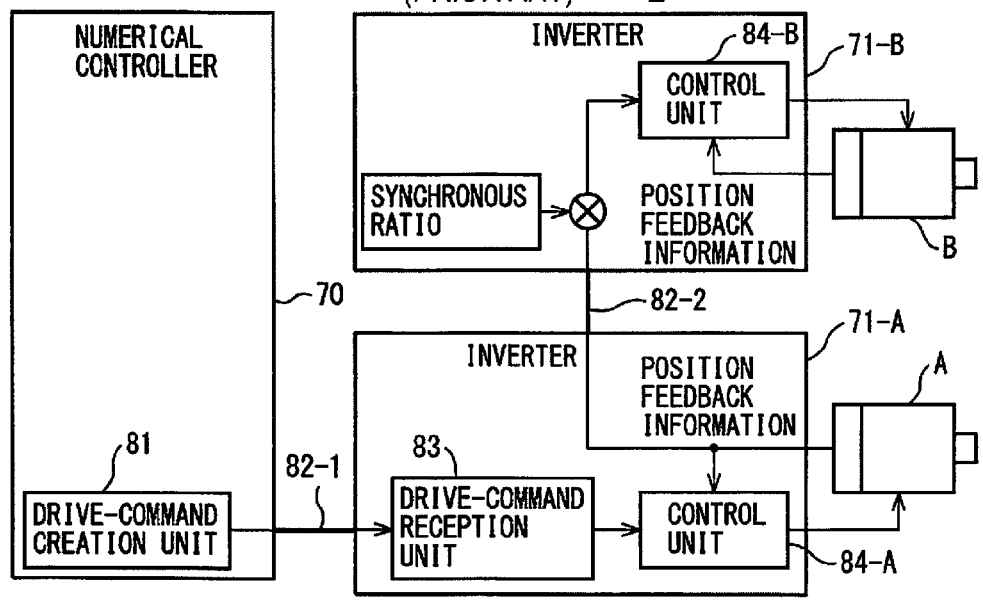
FIG. 9 is a block diagram illustrating an example of the configuration of a motor controller based on the master/slave synchronization.

FIG. 5 is a block diagram illustrating a concrete configuration of a motor controller according to a second example. In addition, FIG. 6 is a flowchart representing an operation flow of the motor controller illustrated in FIG. 5. In the second example, a branch circuit 44 provided outside the tool-shaft inverter 12-A is used instead of the communication unit 43 in the tool-shaft inverter 12-A in the above-described first example.

In FIG. 5, the branch circuit 44 divides the position feedback information from the tool-shaft motor A to distribute the position feedback information to the tool-shaft inverter 12-A and the workpiece-shaft inverter 12-B. In this example, all the circuit components except the branch circuit 44 are the same as those illustrated in FIGS. 1 and 2. Hence, the same circuit components are denoted by the same characters, and detailed description of those circuit components is omitted.

In FIG. 6, in STEP S108, instead of STEP S107 in FIG. 3, the position feedback information created by the tool-shaft motor A is divided and distributed to the tool-shaft inverter 12-A and the workpiece-shaft inverter 12-B, by the branch circuit 44. All the operations except this operation are the same as those represented in FIG. 3. Hence, the same operations are denoted by the same characters, and detailed description of those operations is omitted.

In the above-described first and second examples, description has been given by taking, as an example, a case of providing the first motor A in FIG. 1 as a tool-shaft motor and the second motor B in FIG. 1 as a workpiece-shaft motor. However, the first motor A may be provided as a workpiece-shaft motor and the second motor B may be provided as a tool-shaft motor. In this case, the workpiece-shaft motor corresponds to the master shaft and the tool-shaft motor corresponds to the salve shaft at the time with an occurrence of a power failure on the AC power supply side in the synchronous control based on the mater/slave synchronization.

The present invention is applicable to a motor controller for synchronously controlling at least two motors, and particularly to a motor controller for synchronously controlling a tool-shaft motor for driving a tool and a workpiece-shaft motor for driving a workpiece in a machine tool. Such a motor controller can be used in a machine tool including a motor for each drive shaft, and the drive shafts may be a shaft for driving a tool and a shaft for driving a workpiece in a processing machine, for example.

According to the present invention, a low-cost, space-saving motor controller can be provided that is capable of performing a shaft-separating operation when a power failure has occurred on the AC power supply side, in a machine tool for synchronously controlling at least two motors.

In general, both the NC-command synchronization and the master/slave synchronization are used as methods for providing synchronous control of at least two motors, depending on the situation in which the machine tool is used. For example, when the frequency of disturbance in a cutting operation is low, using the master/slave synchronization can increase the accuracy of the synchronous control. However, when the frequency of disturbance in a cutting operation is high, using the master/slave synchronization causes the slave shaft to vibrate due to vibration of the master shaft, which makes stable cutting impossible to maintain. Hence, in such a case, the NC-command synchronization is used. The present invention is especially suitable for a machine tool capable of using the NC-command synchronization to be ready for a case with a high frequency of a disturbance in a cutting operation. Specifically, when a power failure has occurred on the AC power supply side, the motor controller according to the present invention switches from the NC-command synchronization to the master/slave synchronization. This enables a shaft-separating operation for separating the tool shaft and the workpiece shaft from each other by using a regenerative energy generated by motor deceleration, which has been conventionally difficult in the NC-command synchronization. Accordingly, a bulk backup power supply does not need to be provided for a shaft-separating operation, thereby making it possible to provide a low-cost, space-saving motor controller. According to the present invention, when a power failure has occurred on the AC power supply side, synchronous control is performed on the basis of the master/slave synchronization. At the same time, the tool-moving-shaft motor is controlled so that the tool-moving shaft would perform a separating operation, and the DC voltage in the DC link used as an energy source at the time with a power failure is controlled to stay within a predetermined voltage-maintaining range. Hence, the DC voltage in the DC link is unlikely to rapidly decrease or exceed the allowable voltage level when a power failure has occurred.

What is claimed is:

1. A motor controller for synchronously controlling at least two motors, the motor controller comprising:
   a converter configured to convert an alternating-current power, supplied from a side with an alternating-current power supply, to a direct-current power and output the direct-current power;
   a first inverter connected to a direct-current link provided on a direct-current side of the converter, the first inverter configured to convert the direct-current power in the direct-current link to an alternating-current power for driving a first motor and output the alternating-current power, on the basis of a received command;
   a second inverter connected to the direct-current link, the second inverter configured to convert the direct-current power in the direct-current link to an alternating-current power for driving a second motor and output the alternating-current power, on the basis of a received command;
   a power-failure detection unit configured to detect whether or not a power failure has occurred on the side, with the alternating-current power supply, of the converter; and
   a command creation unit configured to
      create, for each of the first inverter and the second inverter, a numerical-control-command-synchronization drive command for synchronously controlling the first motor and the second motor, when the power-failure detection unit does not detect any power failure, and
      create a master drive command for the first inverter and also create, for the second inverter, a slave drive command for synchronously controlling the first motor and the second motor by using position feedback information of the first motor driven according to the master drive command, when the power-failure detection unit detects a power failure,
   wherein
   the command creation unit includes a direct-current-voltage-maintaining-command creation unit for creating, as the master drive command, a direct-current-voltage maintaining command for controlling the first inverter so that a voltage in the direct-current link stays within a predetermined range, and
   the direct-current-voltage-maintaining-command creation unit is provided in the first inverter.

2. A motor controller for synchronously controlling at least two motors, the motor controller comprising:
   a converter configured to convert an alternating-current power, supplied from a side with an alternating-current power supply, to a direct-current power and output the direct-current power;
   a first inverter connected to a direct-current link provided on a direct-current side of the converter, the first inverter configured to convert the direct-current power in the direct-current link to an alternating-current power for driving a first motor and output the alternating-current power, on the basis of a received command;

a second inverter connected to the direct-current link, the second inverter configured to convert the direct-current power in the direct-current link to an alternating-current power for driving a second motor and output the alternating-current power, on the basis of a received command;

a power-failure detection unit configured to detect whether or not a power failure has occurred on the side, with the alternating-current power supply, of the converter; and a command creation unit configured to
create, for each of the first inverter and the second inverter, a numerical-control-command-synchronization drive command for synchronously controlling the first motor and the second motor, when the power-failure detection unit does not detect any power failure, and create a master drive command for the first inverter and also create, for the second inverter, a slave drive command for synchronously controlling the first motor and the second motor by using position feedback information of the first motor driven according to the master drive command, when the power-failure detection unit detects a power failure, wherein the command creation unit includes a drive-command creation unit for creating the numerical-control-command-synchronization drive command, the drive-command creation unit is provided in a numerical controller that controls operations of the first motor and the second motor as a whole, and the slave drive command, for the second inverter, for synchronously controlling the first motor and the second motor by using the position feedback information when the power-failure detection unit detects a power failure, is created in the second inverter.

3. The motor controller according to claim 2, further comprising:
a first communication unit that connects the drive-command creation unit and the first inverter to enable the drive-command creation unit and the first inverter to communicate with each other; and a second communication unit that connects the drive-command creation unit and the second inverter to enable the drive-command creation unit and the second inverter to communicate with each other, wherein the numerical-control-command-synchronization drive command created by the drive-command creation unit when the power-failure detection unit does not detect any power failure, is transmitted to each of the first inverter and the second inverter via the first communication unit and the second communication unit, respectively.

4. The motor controller according to claim 1, further comprising a third communication unit that connects the first inverter and the second inverter to enable the first inverter and the second inverter to communicate with each other, wherein
the position feedback information transmitted from the first motor to the first inverter when the power-failure detection unit detects a power failure, is transferred to the second inverter via the third communication unit.

5. The motor controller according to claim 1, further comprising a branching unit that divides the position feedback information from the first motor and provides the first inverter and the second inverter with obtained respective pieces of the position feedback information.

6. The motor controller according to claim 1, wherein any one of the first motor and the second motor is a tool-shaft motor for driving a tool shaft of a machine tool to rotate, while the other is a workpiece-shaft motor for driving a workpiece shaft of the machine tool to rotate.

7. The motor controller according to claim 6, further comprising:
a third inverter connected to the direct-current link, the third inverter configured to convert the direct-current power in the direct-current link to an alternating-current power for driving a tool-moving-shaft motor for controlling a distance between the tool shaft and the workpiece shaft, and output the alternating-current power, on the basis of a received command, wherein the command creation unit includes a separation-command creation unit configured to create, for the third inverter, a separation command for driving the tool-moving-shaft motor so that one of the tool shaft and the workpiece shaft is separated from the other, when the power-failure detection unit detects a power failure.

8. The motor controller according to claim 6, wherein the tool shaft is a shaft for driving a tool in any one of a gear processing machine and a cam processing machine.

9. The motor controller according to claim 7, wherein the tool shaft is a shaft for driving a tool in any one of a gear processing machine and a cam processing machine.

10. A motor controller for synchronously controlling at least two motors, the motor controller comprising:
a converter configured to convert an alternating-current power, supplied from a side with an alternating-current power supply, to a direct-current power and output the direct-current power;

a first inverter connected to a direct-current link provided on a direct-current side of the converter, the first inverter configured to convert the direct-current power in the direct-current link to an alternating-current power for driving a first motor and output the alternating-current power, on the basis of a received command;

a second inverter connected to the direct-current link, the second inverter configured to convert the direct-current power in the direct-current link to an alternating-current power for driving a second motor and output the alternating-current power, on the basis of a received command;

a power-failure detection unit configured to detect whether or not a power failure has occurred on the side, with the alternating-current power supply, of the converter; and a command creation unit configured to
create, for each of the first inverter and the second inverter, a numerical-control-command-synchronization drive command for synchronously controlling the first motor and the second motor, when the power-failure detection unit does not detect any power failure, and create a master drive command for the first inverter and also create, for the second inverter, a slave drive command for synchronously controlling the first motor and the second motor by using position feedback information of the first motor driven according to the master drive command, when the power-failure detection unit detects a power failure, wherein, when the power-failure detection unit does not detect any power failure, the command creation unit is configured to
create the numerical-control-command-synchronization drive command for the first inverter, output the numerical-control-command-synchronization drive command for the first inverter to the first inverter, create the numerical-control-command-synchronization drive command for the second inverter by multiplying a synchronous ratio with the numerical-control-command-synchronization drive command for the first inverter, and output the numerical-control-command-synchronization drive command for the second inverter to the second inverter.

11. The motor controller according to claim 10, wherein
the command creation unit includes a direct-current-voltage-maintaining-command creation unit for creating, as the master drive command, a direct-current-voltage maintaining command for controlling the first inverter so that a voltage in the direct-current link stays within a predetermined range, and
the direct-current-voltage-maintaining-command creation unit is provided in the first inverter.

12. The motor controller according to claim 10, wherein
the command creation unit includes a drive-command creation unit for creating the numerical-control-command-synchronization drive command,
the drive-command creation unit is provided in a numerical controller that controls operations of the first motor and the second motor as a whole, and
the slave drive command, for the second inverter, for synchronously controlling the first motor and the second motor by using the position feedback information when the power-failure detection unit detects a power failure, is created in the second inverter.

13. The motor controller according to claim 12, further comprising:
a first communication unit that connects the drive-command creation unit and the first inverter to enable the drive-command creation unit and the first inverter to communicate with each other; and
a second communication unit that connects the drive-command creation unit and the second inverter to enable the drive-command creation unit and the second inverter to communicate with each other, wherein
the numerical-control-command-synchronization drive command created by the drive-command creation unit when the power-failure detection unit does not detect any power failure, is transmitted to each of the first inverter and the second inverter via the first communication unit and the second communication unit, respectively.

14. The motor controller according to claim 10, further comprising a third communication unit that connects the first inverter and the second inverter to enable the first inverter and the second inverter to communicate with each other, wherein
the position feedback information transmitted from the first motor to the first inverter when the power-failure detection unit detects a power failure, is transferred to the second inverter via the third communication unit.

15. The motor controller according to claim 10, further comprising a branching unit that divides the position feedback information from the first motor and provides the first inverter and the second inverter with obtained respective pieces of the position feedback information.

16. The motor controller according to claim 10, wherein any one of the first motor and the second motor is a tool-shaft motor for driving a tool shaft of a machine tool to rotate, while the other is a workpiece-shaft motor for driving a workpiece shaft of the machine tool to rotate.

17. The motor controller according to claim 16, further comprising:
a third inverter connected to the direct-current link, the third inverter configured to convert the direct-current power in the direct-current link to an alternating-current power for driving a tool-moving-shaft motor for controlling a distance between the tool shaft and the workpiece shaft, and output the alternating-current power, on the basis of a received command, wherein
the command creation unit includes a separation-command creation unit configured to create, for the third inverter, a separation command for driving the tool-moving-shaft motor so that one of the tool shaft and the workpiece shaft is separated from the other, when the power-failure detection unit detects a power failure.

18. The motor controller according to claim 16, wherein the tool shaft is a shaft for driving a tool in any one of a gear processing machine and a cam processing machine.

19. The motor controller according to claim 17, wherein the tool shaft is a shaft for driving a tool in any one of a gear processing machine and a cam processing machine.

* * * * *